United States Patent [19]

Nakajima et al.

[11] Patent Number: 5,176,877
[45] Date of Patent: Jan. 5, 1993

[54] NUCLEAR FUEL ASSEMBLY AND NUCLEAR REACTOR CORE CONTAINING SAID ASSEMBLY

[75] Inventors: Akinobu Nakajima, Hitachi; Yasunori Bessho; Motoo Aoyama, both of Mito; Junichi Koyama, Hitachi; Hiromasa Hirakawa, Hitachi; Junichi Yamashita, Hitachi; Tatsuo Hayashi, Hitachi, all of Japan

[73] Assignee: Hitachi, Ltd., Tokyo, Japan

[21] Appl. No.: 584,745

[22] Filed: Sep. 19, 1990

[30] Foreign Application Priority Data

Sep. 22, 1989 [JP] Japan ............................ 1-245049

[51] Int. Cl.⁵ ............................................. G21C 3/32
[52] U.S. Cl. ................................. 376/435; 376/244; 376/428; 376/447
[58] Field of Search ............... 376/435, 241, 244, 434, 376/447, 428

[56] References Cited

U.S. PATENT DOCUMENTS

| | | | |
|---|---|---|---|
| 3,382,153 | 5/1968 | Bigge et al. | 376/435 |
| 4,695,425 | 9/1987 | Aoyama et al. | 376/435 |
| 4,863,680 | 9/1989 | Sakurada et al. | 376/444 |
| 4,876,062 | 10/1989 | Aoyama et al. | 376/444 |

FOREIGN PATENT DOCUMENTS 0065697A 1/1982 European Pat. Off. ............ 376/435

Primary Examiner—Donald P. Walsh
Assistant Examiner—Meena Chelliah
Attorney, Agent, or Firm—Antonelli, Terry, Stout & Kraus

[57] ABSTRACT

A nuclear fuel assembly for a nuclear reactor has a plurality of vertically extending fuel rods arranged side by side in a square array and containing fissile material. The array has two adjacent first sides which are next to a control rod region of the core and two adjacent second sides which are next to a non-control rod region of the core. When the rods of the array as seen in horizontal cross section, excluding the rods lying on the diagonal line joining the opposite corners of the array at which the control rod region meets the non-control rod region, is divided into four regions which are a: the rods in the row and column of said array adjoining said first sides;
b: the rods lying between said region a and said diagonal line;
c: the rods lying between said region d and said diagonal line,
d: the rods in the row and column of said array adjoining said second sides and; over at east part of the height containing fissile material, the average concentration of fissile material per fuel rod is higher in said region b than said region c and by at least 5% and, among all said regions a, b, c, d, is a minimum in said region a. This provides good control rod worth and low local power peaking.

18 Claims, 10 Drawing Sheets

| | Natural Uranium |
|---|---|
| * | Fuel Enrichment |
| ** | Gadolinium Enrichment |

| | Natural Uranium |
| --- | --- |
| * | Fuel Enrichment |
| ** | Gadolinium Enrichment |

NUCLEAR FUEL ASSEMBLY AND NUCLEAR REACTOR CORE CONTAINING SAID ASSEMBLY

BACKGROUND OF THE INVENTION

1. FIELD OF THE INVENTION

This invention relates to nuclear fuel assemblies and to nuclear reactor cores containing such assemblies, and is particularly concerned with such fuel assemblies for a boiling water reactor (BWR).

2. DESCRIPTION OF THE PRIOR ART

FIG. 7 of the accompanying drawings shows in horizontal section an arrangement of four fuel assemblies in a current BWR core. Specifically, a fuel bundle, which is constructed by arranging fuel rods 2 in a square lattice or array, is in the middle of a unit cell 22 of the core, and a channel box 23, positioned outside the fuel bundle, defines a water gap region around the fuel assembly outside the channel box for flow of light water as a coolant without boiling. Due to the presence of a space to allow a cross-shaped control rod 24 to be inserted, this water gap region is composed of gaps 25, at which the control rod 24 is inserted (herein called a control rod region) and gaps 26 at which the control rod 24 is not inserted nor withdrawn (herein called a non-control rod region).

In order to reduce the power cost for a light-water type reactor, it is effective to reduce the fuel cycle cost. One of the methods is to increase the average discharge exposure. Generally, the more the discharge exposure is increased, the more the average enrichment of the fuel assembly is increased. As the fuel enrichment becomes higher, the reactivity in the cold state of the core (about 20° C.) becomes higher, so that the difference between the reactivities at the hot state (which means that the coolant temperature is about 280° C.) and at cold becomes larger (that is to say, the reactivity difference between hot and cold increases). With a high reactivity, the control rods are used to control so as to balance the amounts of production and absorption of neutrons. When inserted in the hot state and in the cold state, the control rod is present at one side of the fuel assembly as shown in FIG. 7.

The neutron absorber B₄C in the control rod decreases reactivity, especially by absorbing thermal neutrons. Even if the relative enrichment distribution of the fuel assembly is identical, when the enrichment is increased, the effect of absorption of the thermal neutrons by the control rod is decreased. Therefore, the so-called control rod worth at the cold is decreased.

The control rod worth is the value of reactivity worth of the control rod, which is proportional to the square of the neutron flux at the position of the control rod.

In the case of the core for a high-burn-up, therefore the cold shut-down margin has a tendency to become small (that is to say, undesirably the margin may easily become critical at the shut-down of the reactor).

In order to improve the reactor cold shut-down margin, the following methods can be considered:

(1) Enhancing the control rod worth to increase the difference between the reactivities at cold with and without the insertion of the control rod; and (2) Decreasing the difference between the reactivities at the hot and at the cold states.

The BWRs being run at present have cores of two different types, i.e. the C-lattice core, in which the water gap regions 25 and 26 have an equal area, as shown in FIG. 7, and the D-lattice core in which the water gap 25 which receives the control rod 24 is wider than the water gap 26 which does not receive a control rod (non-control rod region).

FIG. 8 of the accompanying drawings exemplifies the method of enhancing control rod worth disclosed in JP-A-61-275696, in which the enrichment with fissile material of fuel rods 32 at the sides of the fuel rod array adjacent the cross-shaped control rod 31 is higher than the average enrichment per fuel rod of the fuel assembly. This arrangement can indeed achieve improvement of the control rod worth, because the control rod when inserted into the core is adjacent the fuel regions of highest enrichment. However, when this is applied to a D-lattice type core, during operation when the control rods are absent, the regions of high enrichment are next to wide water gaps providing a high neutron moderation and consequently the local power peaking factor at these regions of high enrichment is likely to be large. The local power peaking factor is defined as the ratio of maximum local power in the fuel assembly, as seen in cross section, relative to the average value of the power. In a reactor having a small local power peaking factor, power output is flattened as is desirable.

FIG. 9 of the accompanying drawings shows another method disclosed in JP-A-63-98590 for enhancing the control rod worth in the cold condition of the reactor. The fuel assembly is divided into four sub-assemblies 43,44, and the average enrichment of the sub-assembly 44 which is closest to the control rod 45 is higher than in the other three sub-assemblies 43. In this fuel assembly, a cross-shaped water channel is arranged at the center of the fuel assembly to divide it into the four sub-assemblies 43 and 44.

Another method of improvement of control rod worth is disclosed in JP-A-64-31091, in which the fuel assembly includes at least one water rod. The water rod or rods is shifted in the fuel rod array from the conventional central position towards the corner of the array at which the two sides adjacent the non-control rod region meet. This has the effect of shifting some of the fuel rods containing fissile material towards the control rod region, thus improving the control rod worth. This prior art document also discloses a conventional distribution of the fissile material among the fuel rods in the array, in which, when the array is notionally divided into four regions, and excluding from any of those regions rods lying on the diagonal line joining the opposite corners at which the control rod region meets the non-control rod region, these four regions of the array being a: the row and column adjoining the control rod region;
 b: the fuel rods between the region a and the said diagonal line;
 c: the fuel rods lying between the region d and said diagonal line,
 d: the row and column adjoining the non-control rod regions;

the average concentration of fissile material per fuel rod in the region c is lower than in the region b. A fuel distribution of this kind is given in FIGS. 10 and 14 of the drawings of the present application. FIG. 10 show, in horizontal section a 8×8 square array of fuel rods in a fuel assembly and FIG. 14 a 9×9 square array of fuel rods in a fuel assembly. The symbols A,B,C etc. used in FIG. 10 are explained below in connection with FIG. 1 and Table 1, in which they have the same meaning.

Likewise the symbols A',B',C'... G' have the same meaning as in FIG. 3 and Table 2 below, and the fuel enrichment of rods H' of FIG. 14 is 4.30 wt. % (no Gd content). Regions a,b,c,d defined above are indicated by reference numerals 4,5,6,7 respectively in FIG. 10. The exact fuel distributions of FIGS. 10 and 14 are not disclosed in the prior art, and are included here for the purposes of comparison with the fuel rod assemblies embodying the invention discussed below. These fuel distributions are called representative cases, below.

The reason for this conventional fuel distribution in a core of the D-lattice type is to achieve a flattened power distribution in the array, i.e. a low local power peaking factor. The regions a and d are close to water gaps, where the moderating effect of the water results in a higher neutron flux, leading to higher output in these regions. Therefore the fuel concentration is lower in these regions. In the D-lattice core, the control rod gap adjoining the region a is wider than the non-control gap adjoining the region d. Therefore the region b is closer to a wider water gap than the region c. To achieve a flattened power output, the region b is given a lower average fuel concentration per rod than the region c, to compensate for the moderating effect of the water in the wider water gap.

In the fuel assemblies of JP-A-64-31091 mentioned above, the effect of the shifting of the water rods into the region c is to disturb substantially the flattened power distribution achieved with the conventional fuel distribution just described. The moderating effect of the water rod or rods in the region c makes the region c liable to have a high power output, leading to a high local power peaking factor.

EP-A-284016 and corresponding US-A-4876062 are primarily concerned with the shape of water rods in nuclear fuel assemblies, but disclose in FIG. 22 a fuel assembly having a water rod which is located partly in the region c mentioned above, and having a fuel distribution in which the average concentration per rod in the region b is greater than in the region c by about 3.5%. In particular, fuel rods containing burnable poison are located close to the water rod. In connection with the location of the water rod and also the specific cross-sectional shape of the water rod of that FIG. 22, it is mentioned that the distribution of neutron fluxes can effectively be made even. No reason is given for this particular pattern of fuel enrichment.

SUMMARY OF THE INVENTION

An object of the invention is to provide a fuel assembly in which improvement of the control rod worth is achieved together with an acceptably flat power distribution i.e. an acceptable local power peaking factor.

A further object of the present invention is to provide a fuel assembly which in a reactor core provides an improved shut-down margin.

Another object of the present invention is to provide a fuel assembly which has a high burn-up and provides a satisfactory shut-down margin.

The solution adopted by the present invention is to pay attention to the average fuel concentration in the region b identified above. In one aspect, according to the invention and in contrast to the prior art, the average fissile material concentration per fuel rod is higher in the region b than in the region c, and is minimum in the region a. In this way there can be achieved an appropriate level of the local power peaking, which is beneficial in relation to the integrity of the fuel rods, combined with good control rod worth. The good control rod worth arises because of the increased fuel concentration in region b, nearer to the control rod gap region.

The invention is in principle applicable to reactor cores of both the C-lattice and D-lattice types, and provides particular advantage for the D-lattice type.

The position of one or more water rods in the fuel assembly can have a significant and beneficial effect. Preferred locations are (i) at the center of the fuel rod array, i.e. at a location which is symmetrical with respect to both diagonals and (ii) wholly within the region c. The effect of locating the water rods wholly within the region c is to increase the number of fuel rods in region b, which also has the effect of improving control rod worth and making possible an excellent level of local power peaking in the fuel assembly.

By increasing the control rod worth, both when the reactor core is cold and when it is hot (i.e. in the running state), the present invention makes it possible to achieve a larger shut-down margin.

According to the invention in one aspect, therefore, there is provided a nuclear fuel assembly for a nuclear reactor, having a plurality of vertically extending fuel rods arranged side by side in a square array and containing fissile material. The array has two adjacent first sides which, when the fuel assembly is in the reactor core, are next to a control rod region of the core and two adjacent second sides which, when the fuel assembly is in said reactor core, are next to a non-control rod region of the core. When the array as seen in horizontal cross section is notionally divided into four regions and excluding from all such regions the rods lying on the diagonal line joining opposite corners of the array at which one first side meets one second side, said four regions being a: the rods in the row and column of the array adjoining said first sides;
   b: the rods lying between said region a and said diagonal line;
   c: the rods lying between said region d and said diagonal line;
   d: the rods in the row and column of the array adjoining said second sides and;

over at least part of the height region of the assembly containing fissile material (preferably at least the uppermost 10% of that height region), the average concentration of fissile material per fuel rod is higher in the region b than said region c by at least 5% and, among all said regions a, b, c, d, is a minimum in said region a. The average concentration of fissile material per fuel rod is preferably higher in said region b than in said region c by an amount in the range 5–10%.

The fuel assembly may include a plurality of said fuel rods containing also burnable poison, there being more of the rods containing said burnable poison in the region c than in the region b. The number of said fuel rods in the region b may be larger than the number thereof in the region c.

When the fissile material is present in fuel pellets in the fuel rods, the average outer diameter of the fuel pellets may be larger in the region b than in the region c and/or the average pellet density per fuel rod may be higher in the region b than in the region c. The fissile material may comprise at least one of U-235, Pu-239 and Pu-241.

Preferably, the fuel assembly includes at least one water rod located in the array, and at least one of (i) the number of water rods and (ii) the flow passage area of the water rod or rods is larger in said region c than in said region b.

According to the invention in another aspect, over at least part of the height region of the assembly containing fissile material, the average concentration of fissile material per fuel rod is higher in the region b than the region c and, among all the regions a, b, c, d, is a minimum in the region a, and said fuel assembly further includes at least one water rod occupying in said array a central position symmetrical with respect to both diagonal lines joining opposite corners of the array.

According to the invention in yet another aspect, over at least part of the height region of the assembly containing fissile material, the average concentration of fissile material per fuel rod is higher in the region b than in the region c and, among all the regions a, b, c, d, is a minimum in said region a, and said fuel assembly further includes at least one water rod arranged in said array wholly within said region c, there being no water rod in said region b.

The invention also provides a nuclear reactor core containing at least one fuel assembly of the invention as defined above.

BRIEF INTRODUCTION OF THE DRAWINGS

Embodiments of the invention will now be described by way of non-limitative example with reference to the accompanying generally diagrammatic drawings, in which.

Figure 4A:
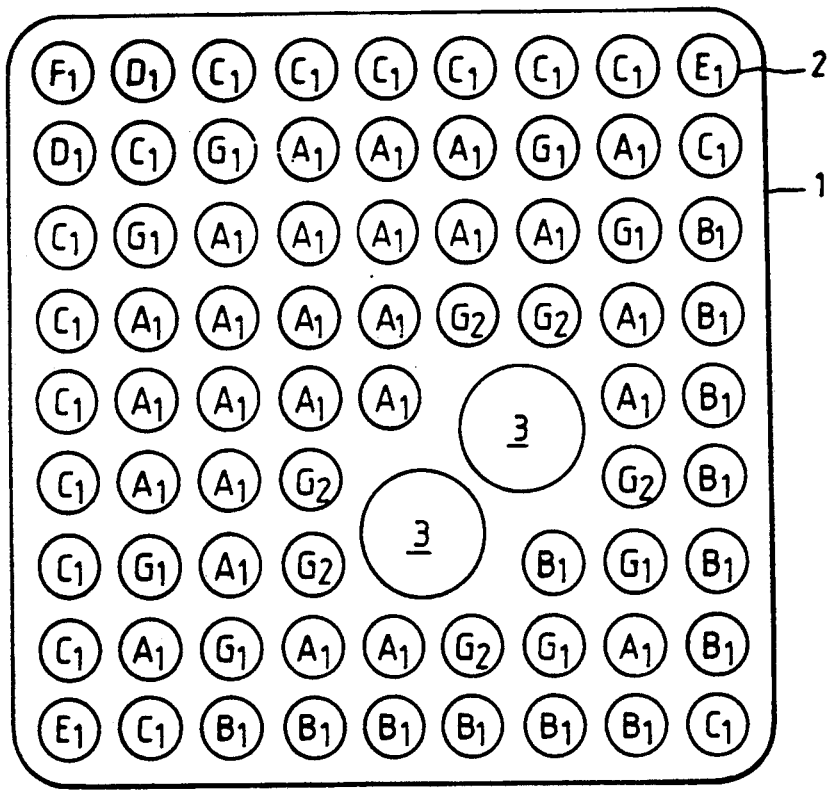
Figure 5A:
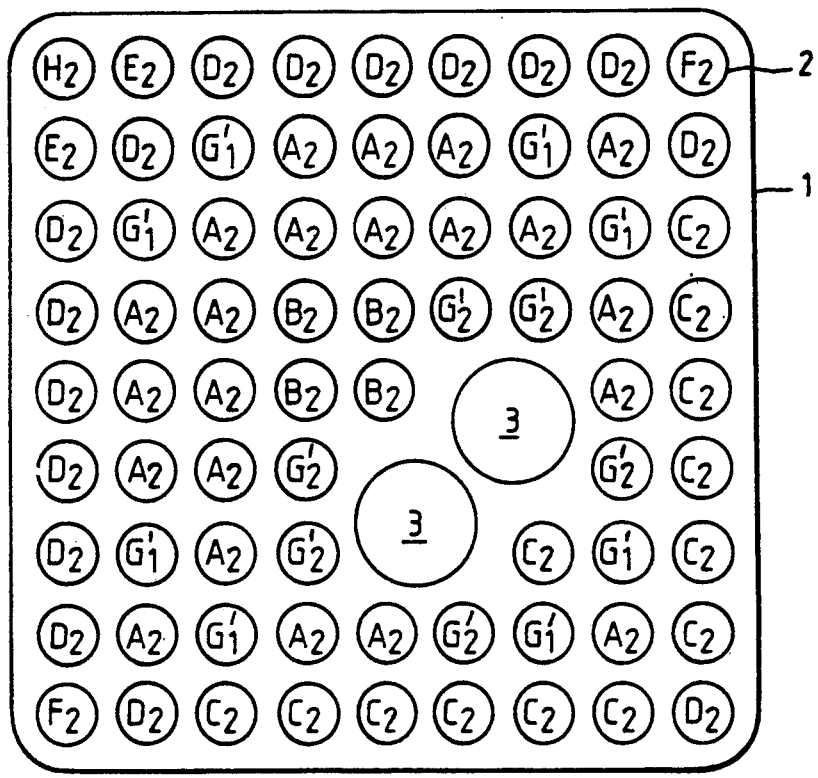
Figure 5B:
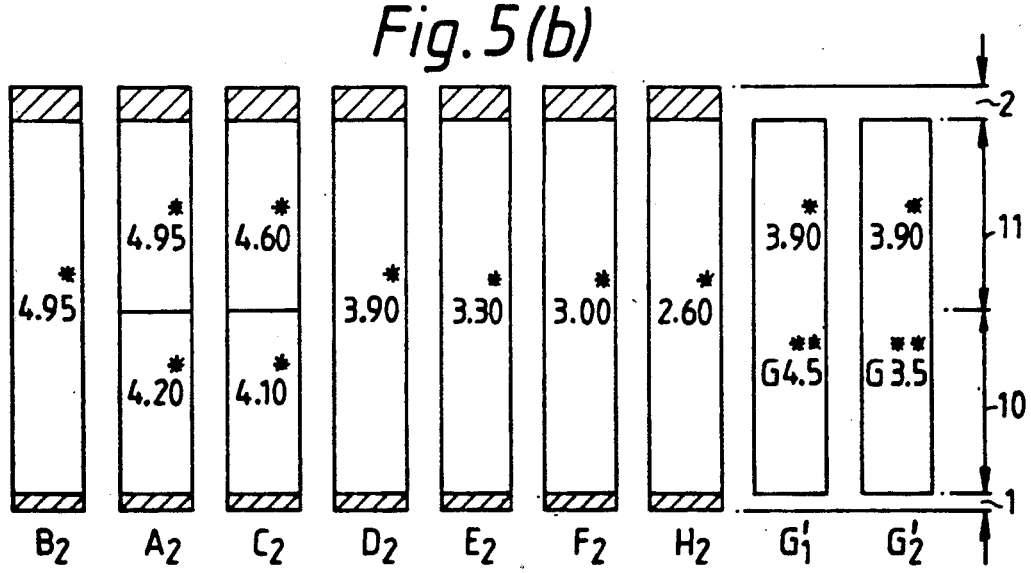
Figure 6A:
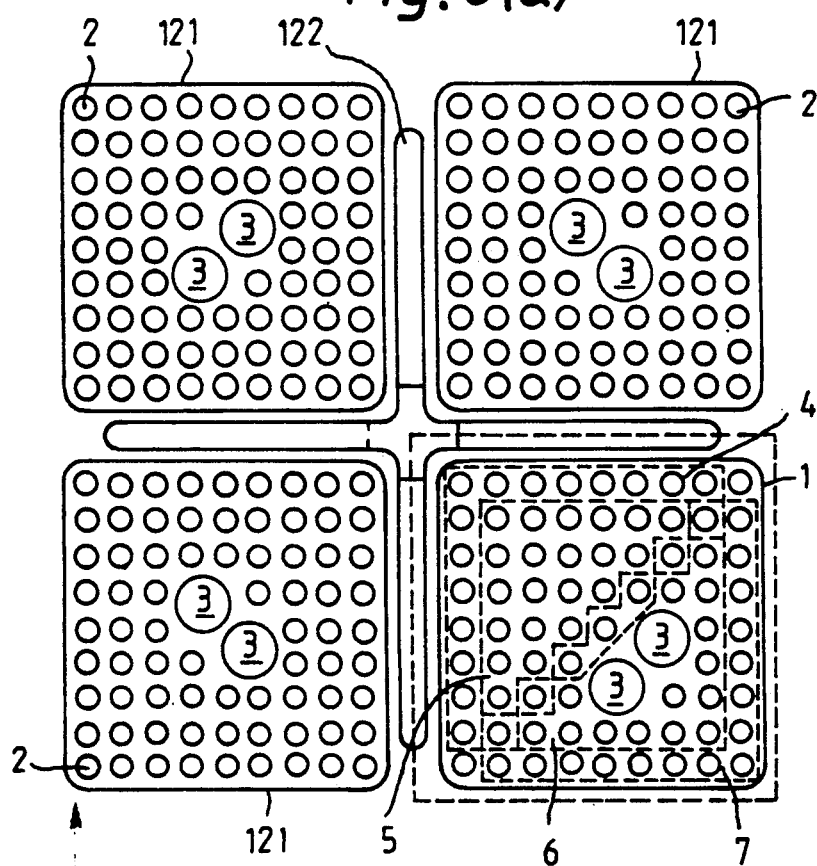
Figure 6B:
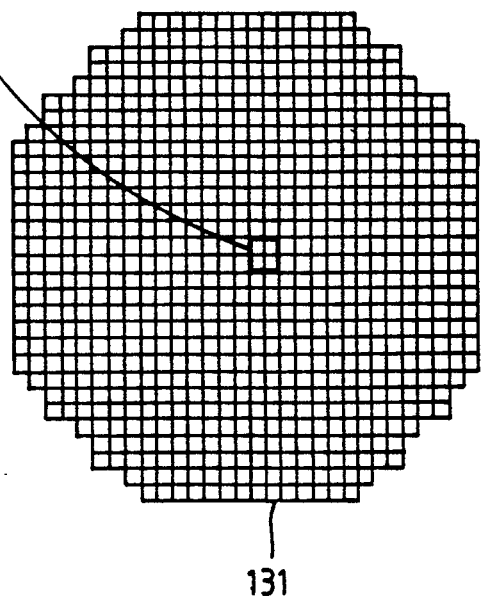
Figure 7:
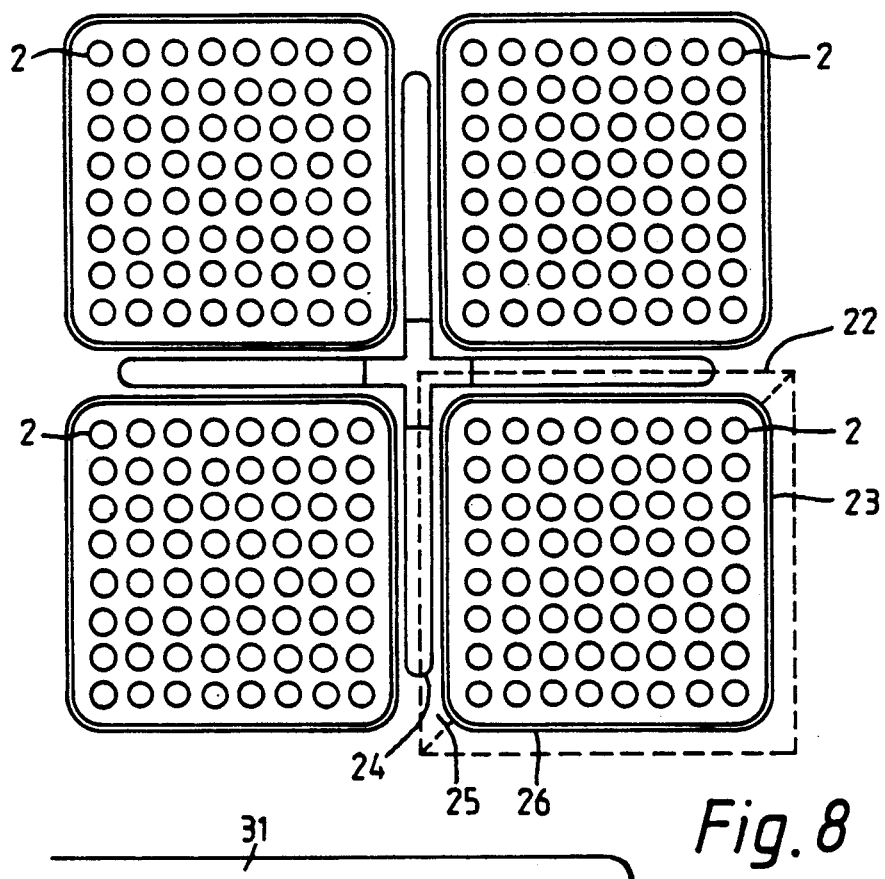
Figure 8:
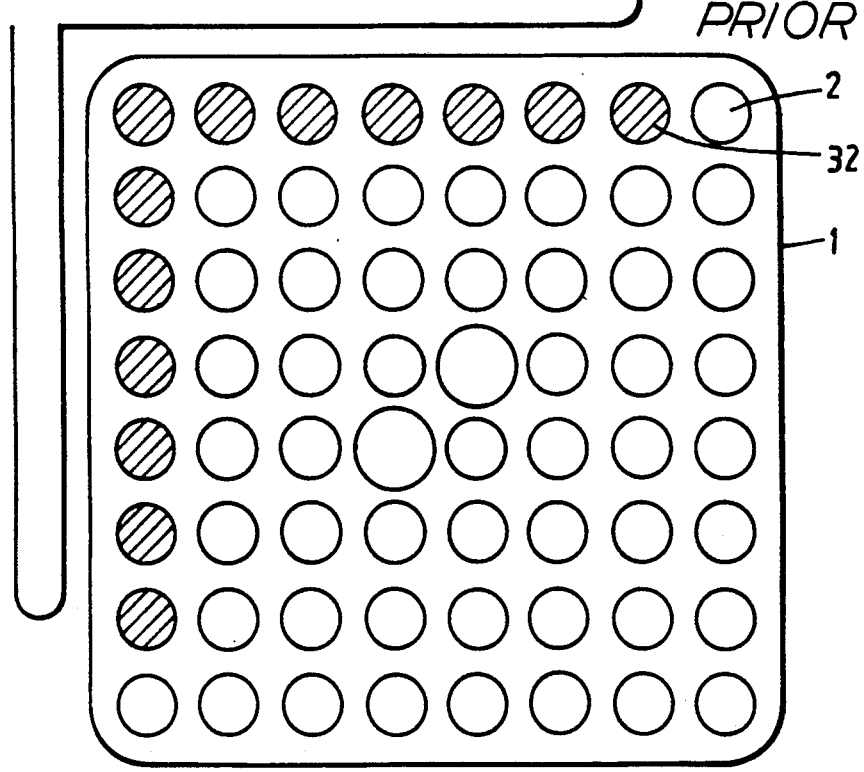
Figure 9:
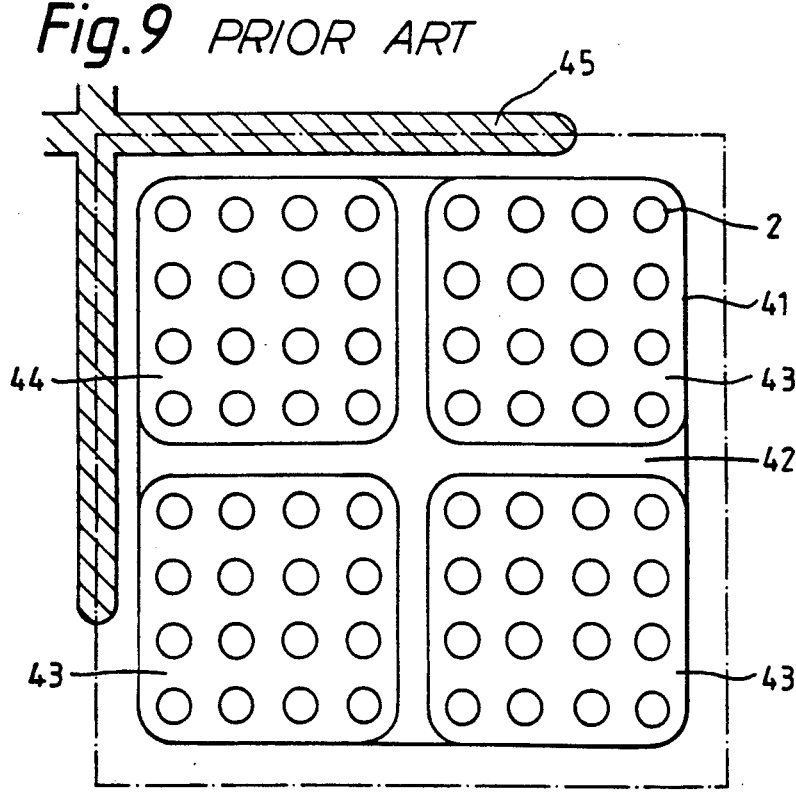
Figure 10:
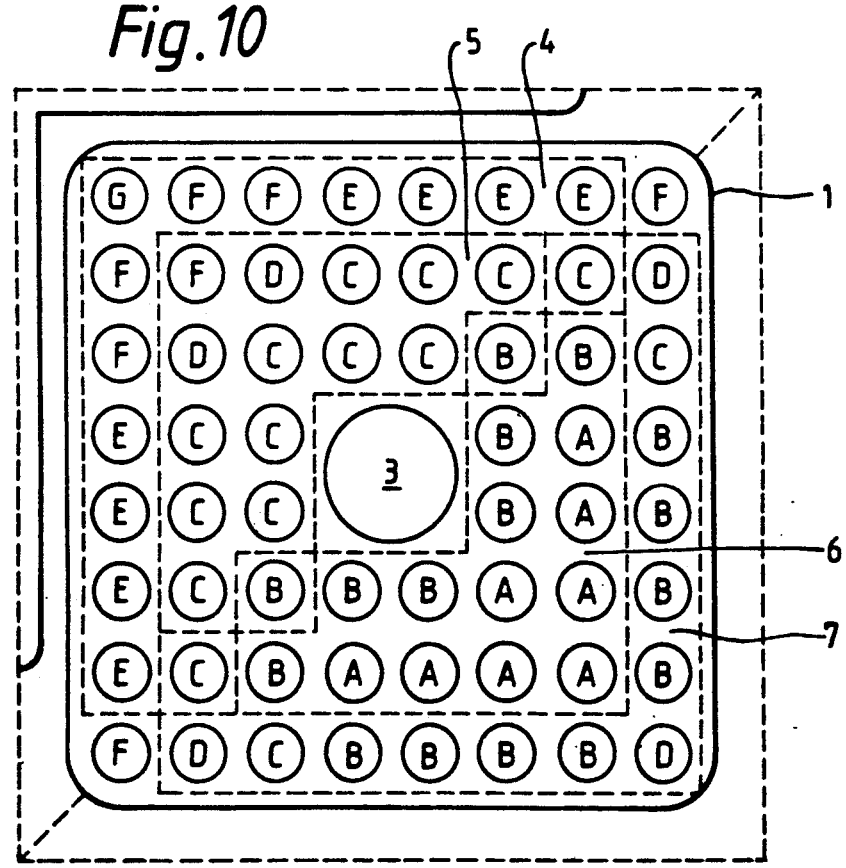
Figure 11:
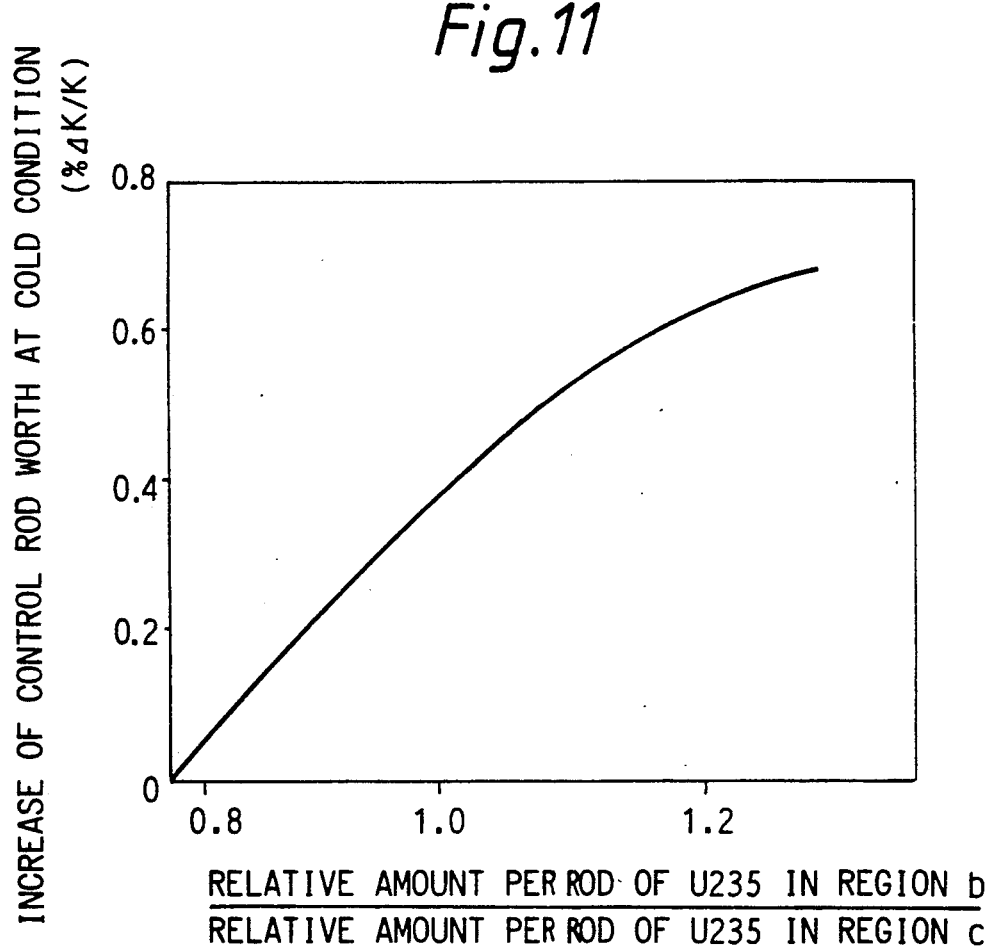
Figure 12:
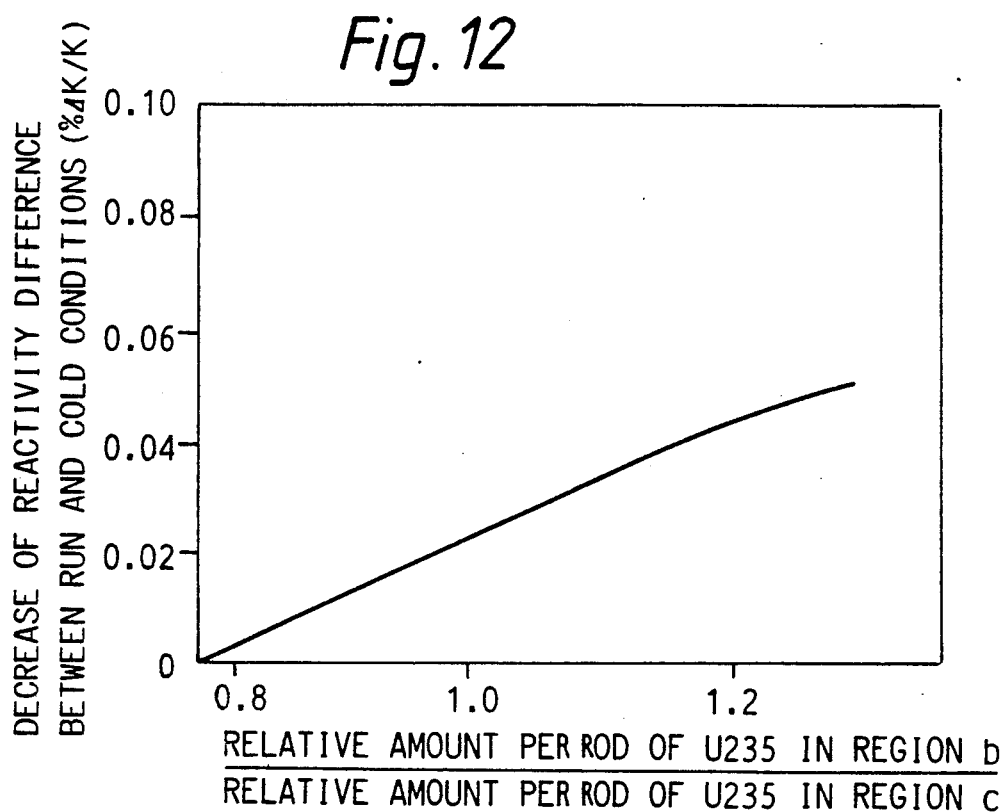
Figure 13:
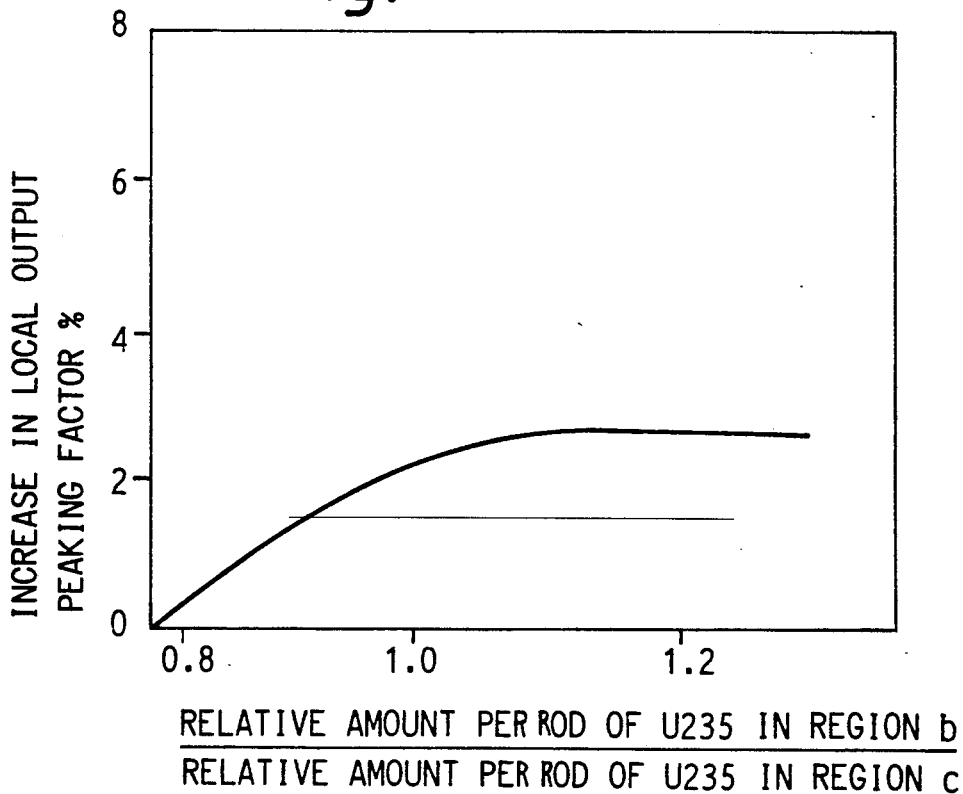

FIGS. 4(a) and (b) are a horizontal section showing a fuel assembly according to a fourth embodiment of the invention and a distribution diagram of its fuel enrichment, respectively;

FIGS. 5(a) and 5(b) are a horizontal section showing a fuel assembly according to a fifth embodiment of the invention and a distribution diagram of its fuel enrichment respectively;

FIGS. 6(a) and 6(b) are a horizontal section showing several fuel assemblies in a reactor core and a horizontal section of the core respectively;

FIG. 7 is a horizontal section showing one fuel assembly according to the prior art;

FIG. 8 is a horizontal section showing another fuel assembly of the prior art;

FIG. 9 is a horizontal section showing yet another fuel assembly of the prior art;

FIG. 10 is a horizontal section showing a fuel assembly to be loaded in a D-lattice core and is illustrated for comparison; and FIGS. 11 to 13 are diagrams for explaining the principle of the present invention.

Figure 14:
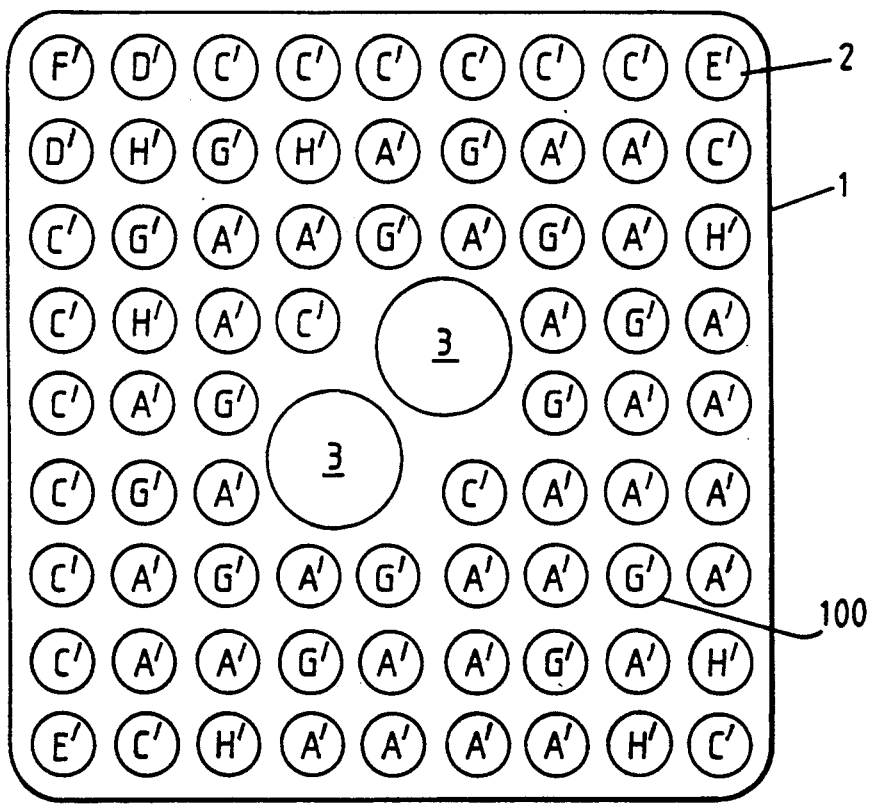

FIG. 14 is a horizontal section of a further fuel rod assembly for a D-lattice core, and is also included for comparison.

DESCRIPTION OF THE PREFERRED EMBODIMENTS

Reference is made first to FIGS. 11 to 13 which illustrate the effects which may be achieved by application of the invention.

FIG. 11 shows the change in the control rod worth at cold when the ratio of the relative amount of U-235 contained in the region b to that in region c is increased. FIG. 11 is for the case where the relative amount of U-235 contained in the region a is the same as in the representative case and is the minimum of all the regions.

Here, the relative amount of U-235 contained in the region b is increased by making the enrichment of the fuel rods, which are not adjacent to the larger water rod 3 positioned at the center of the fuel assembly 1, higher than that of the representative case. The relative amount of U-235 contained in a region is assumed to be expressed by:

[Amount of U-235 Contained in Region]/[Amount of U-235 of Fuel Assembly]. The control rod worth at the cold is increased to an extent of 0.7% $\Delta k/k$ by increasing the relative amount of U-235 contained in the region b by about 30% relative to the representative case to a level higher than that of U-235 contained in the region c. According to the design standards of the boiling water reactor at present, the shut-down margin is 1% $\Delta k$ or more. This illustrates that the present invention can provide a large improvement.

On the other hand, FIG. 12 plots the change in the reactivity difference between the run state and the cold state when the ratio of the relative amount of U-235 contained in the region b to that of region c is increased. If the relative amount of U-235 contained in the region b is increased to exceed that of U-235 contained in the region c, the reactivity difference between the run and the cold is decreased.

FIG. 13 plots the change in the local power peaking factor. The increase in the amount of U-235 in the region b does not exert a large influence upon the increase in the local power peaking factor. Even if the relative amount of U-235 contained in the region b is increased by about 30% relative to the representative case, the increase in the local power peaking factor is about 3% at most. This is because the relative amount of U-235 is minimized in the region adjacent to the wider gap water region, as has been described above.

Since the relative amount of U-235 contained in the region b is increased, it is possible to improve the control rod worth at the cold and the reactivity difference between the run and the cold and accordingly the cold shutdown margin while suppressing the increase in the local power peaking factor.

A specific method for increasing the relative amount of U-235 contained in the region b can be realized by:
  (1) Establishing an enrichment distribution; and
  (2) Changing the fuel inventory among the regions. This second method can be realized by moving a large water rod, which is inserted to prevent the distribution of the thermal neutron flux in the fuel assembly from becoming heterogeneous at the central portion of the fuel assembly, to the region c to increase the number of the fuel rods contained in the region b, in addition to the following methods:
    (a) increasing the fuel pellet diameters;
    (b) increasing the number of fuel rods contained in the regions; and
    (c) increasing the density of fuel pellets.

If the large water rod is moved towards the narrower water gap region providing less moderation, the flatness of the thermal neutron flux distribution in the fuel assembly can be improved, and the reactivity is improved. If the ratio of the thermal neutron flux in the narrower water gap region to that in the wider water gap region are compared, it is at 0.626 in the standard case whereas it can be at 0.738 in the present invention so that the flatness of the thermal neutron flux distribution is improved. As a result, the reactivity is improved by about 0.2% Δk.

If, on the other hand, the relative amount of U-235 contained in the region b is greatly increased by the aforementioned method (1), the local power peaking factor in the region b may rise. According to the method of increasing the relative amount of U-235 contained in the region b by moving the aforementioned large water rod, however, the rise in the local power peaking factor can be suppressed more than by the aforementioned method (1).

Specific embodiments of the invention will now be described with reference to FIGS. 1-6.

In the various figures of the drawings, the same reference numerals are used for corresponding parts, and repeated description of these parts is avoided. The figures showing cross-sectional views of fuel assemblies are in a conventional form in order to show the arrangement of the different fuel rods in the array. Such fuel assemblies are generally well known to those skilled in the art, and their details need not be described. For a general view, see for example FIG. 3 of EP-A-284 016.

Figure 1:
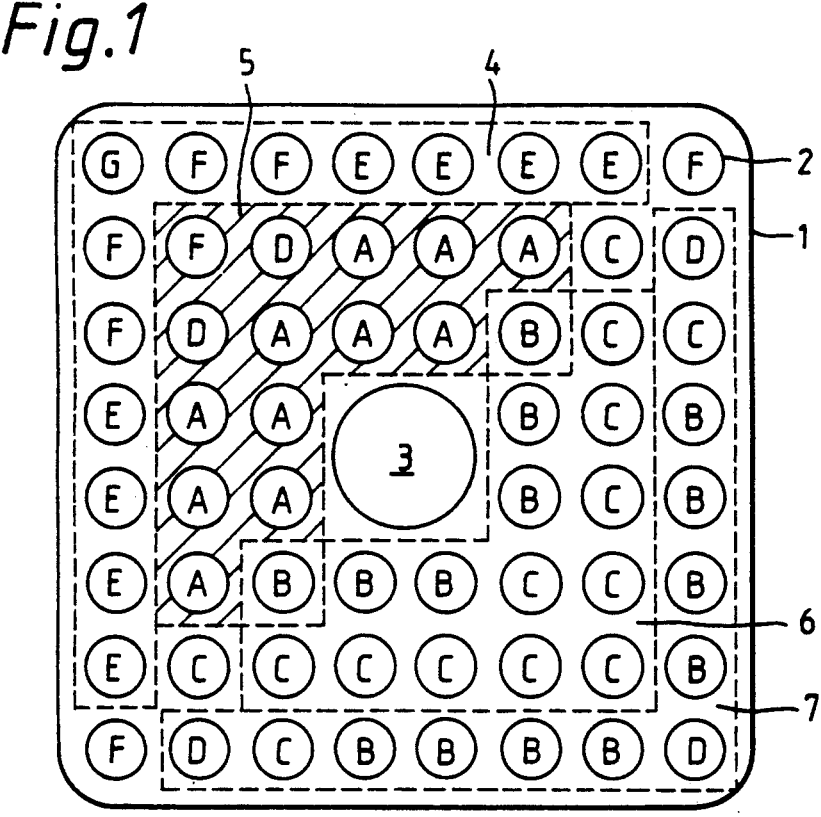
FIG. 1 is a horizontal section showing a fuel assembly according to a first embodiment of the present invention.

FIG. 1 of the present drawings is a horizontal section showing the fuel assembly forming a first embodiment of the present invention. The fuel assembly 1 is constructed by arranging fuel rods 2 side-by-side in a square lattice or array (8×8) and by arranging a large water rod 3 at the center of the fuel assembly 1. The fuel rods 2 are of several types, indicated by A,B,C —. In the present embodiment, the enrichment of the fuel rods 2 with U-235 decreases in the order of A,B,C—, as enumerated in Table 1:

TABLE 1

| Rod type | A | B | C | D | E | F | G |
|---|---|---|---|---|---|---|---|
| Enrichment (Wt. %) | 4.40 | 4.10 | 3.50 | 3.00 | 2.80 | 2.30 | 1.90 |

In the present embodiment, the amounts of U-235 contained in individual notional regions 4 (region a), 5 (region b), 6 (region c) and 7 (region d) already defined above are adjusted in accordance with the desired enrichment distribution. As explained above, region 4 (region a) is adjacent the wide water gap (control rod region) and the region 7 (region d) is adjacent the narrow water gap (non-control rod region). By raising the enrichment of the fuel rods adjacent to the large water rod 3, according to the present embodiment, the relative amount of U-235 contained in the region b is maximized. In the present embodiment, this relative amount is such that the region b contains 27.0% of the total enrichment in the fuel assembly so that the amount of U-235 in region b is about 20% more than that of the representative case shown in FIG. 10. On the other hand, the relative amount of U-235 in the region a is about 16% equal to that of the representative case of FIG. 10. Like the fuel enrichment distribution which is adopted in the fuel assembly loaded in the D-lattice core being run at present, the average fuel enrichment in the region d facing the narrow water gap region is made higher than that of the region a facing the wide water gap so that the local power peaking factor can be suppressed.

In this fuel assembly in which the relative amount of U-235 contained in the region b is increased, as has been described above, the control rod worth at cold, i.e. in the cold condition of the core, is higher by about 0.6% Δk/k than in the representative case of FIG. 10. Moreover, the reactivity difference between the run state and the cold state is reduced by about 0.04% Δk/k. On the other hand, the increase in the local power peaking factor is suppressed to about 3%. According to the present invention, more specifically, the relative amount of U-235 at the control rod side can be increased, as compared with that of the representative case of FIG. 10, thereby augmenting the control rod worth at cold while suppressing the increase in the local power peaking factor. The water rod 3 is central, i.e. is symmetrically located with respect to both diagonal lines of the array.

Figure 2:
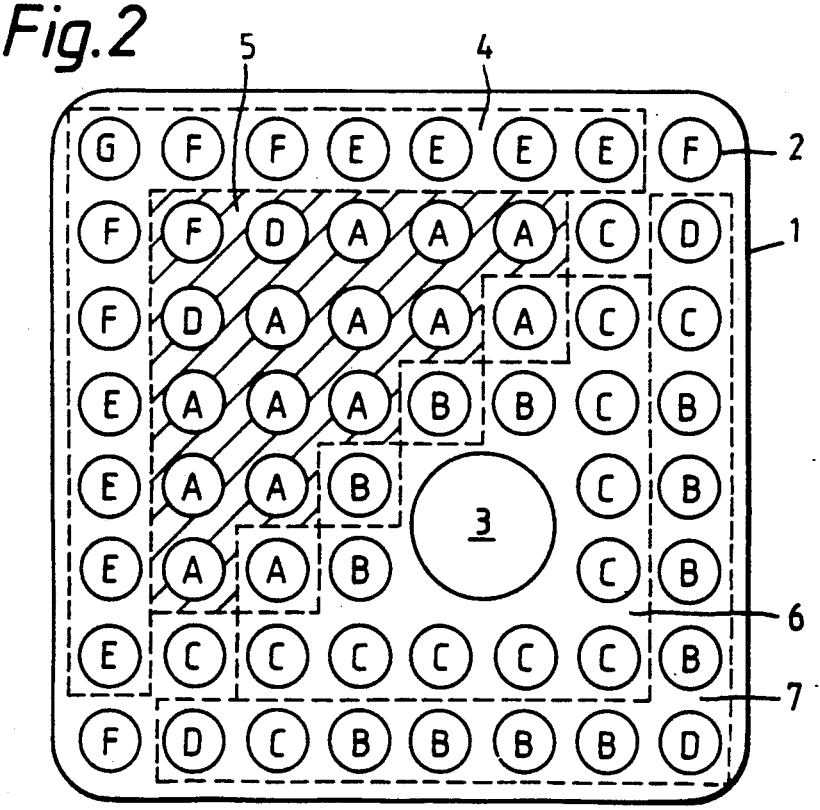
FIG. 2 is a horizontal section showing a fuel assembly according to a second embodiment of the invention.

FIG. 2 is a horizontal section showing a fuel assembly of a second embodiment of the present invention. The embodiment of FIG. 2 is modified from that of FIG. 1 by moving the larger water rod 3, which is positioned in the center of the fuel assembly 1 in FIG. 1, to the region c at the narrower water gap side to increase the number of fuel rods 2 in the region b thereby to increase the relative amount of U-235 contained in the region b. Thus in FIG. 2, the water rod 3 lies wholly within the region c, and is located symmetrically on the upper left to lower right diagonal line joining the corner at the middle of region a to the corner at the middle of region d.

Like the structure of FIG. 1, the reference letters A, B, C—, and so on designate the enrichments of the fuel rods 2. In order to increase the relative amount of U-235 contained in the region b, this region b is arranged with a higher ratio of about 0.9 of the fuel rods having a maximum fuel enrichment to all the fuel rods in the region b. As a result, the relative amount of U-235 contained in the region b is 29.1% of the total amount in the fuel assembly. The than in the representative case of FIG. 10. On the other hand, the amount of U-235 in the region a is equal to that in the representative case of FIG. 10. Because of this arrangement in which the large water rod 3 is moved towards the narrower gap water side to increase the amount of U-235 in the region b more than in the embodiment of FIG. 1, the control rod worth at cold is augmented. The control rod worth at the cold of the present embodiment is more by about 0.7% Δk/k than in the representative case of FIG. 10 and by about 0.1% Δk/k than in the embodiment of FIG. 1.

Since, moreover, the large water rod 3 is moved from the center of the fuel assembly 1 to the region c so as to increase the relative amount of U-235 contained in the region b, the reactivity difference between the run state and the cold state can be reduced in the present embodiment by about 0.2 % Δk/k compared with the representative case of FIG. 10. On the other hand, the increase in the local power peaking factor can be suppressed to about 3% at most, as in the embodiment of FIG. 1, by reason of the enrichment distribution. As has been described above in general discussion, moreover, the reactivity can be improved by about 0.3% Δk.

Figure 3:
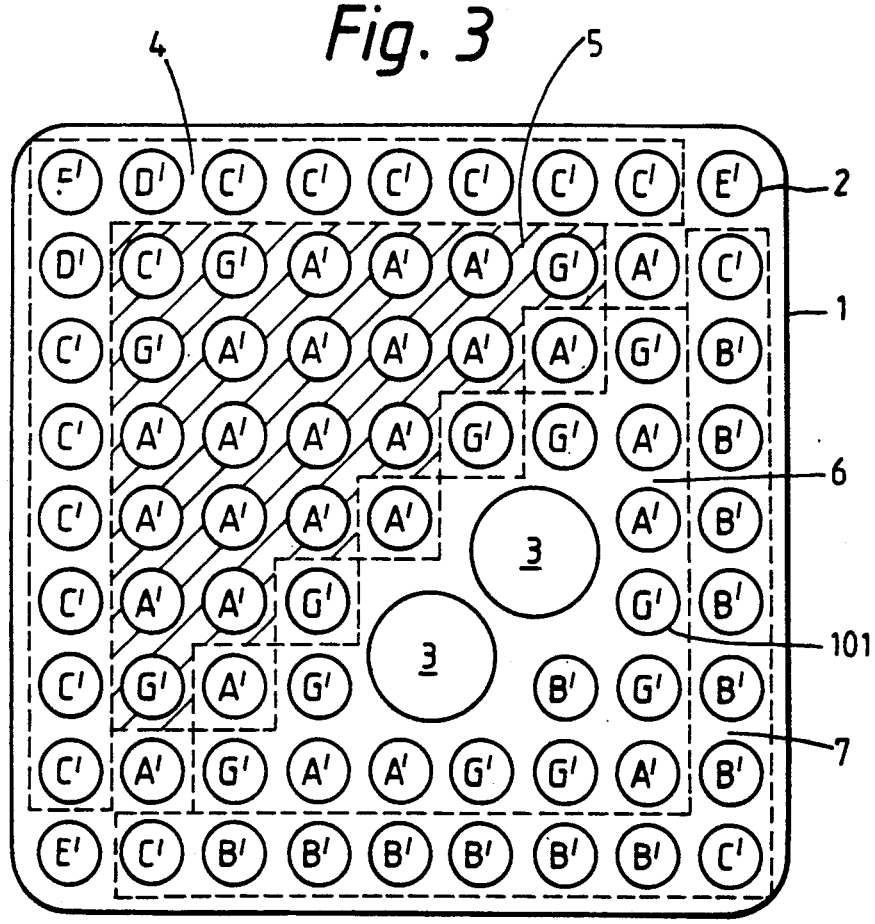
FIG. 3 is a horizontal section showing the fuel assembly according to a third embodiment of the invention.

FIG. 3 is a horizontal section showing a third embodiment of the present invention. In this case, the fuel rods 2 are arrayed in the form of a square 9×9 lattice, and a plurality of large water rods 3, in this case two, are used. The fuel rods 3 are both wholly in the region c and, taken together, are symmetrical about the upper left to lower right diagonal line. The enrichments of the fuel rods 2 of the present embodiment decrease in the order of rod types A', B', C', —and so on, and the symbol G' indicates the gadolinium-containing fuel rods 101. Gd is a burnable poison. The $Gd_2O_3$ content of rods G' is 4.3 wt. %. The fuel enrichments of the fuel rods are enumerated in Table 2.

TABLE 2

| Rod type | A' | B' | C' | D' | E' | F' | G' |
|---|---|---|---|---|---|---|---|
| Enrichment (Wt. %) | 4.90 | 4.50 | 3.80 | 3.50 | 3.10 | 2.60 | 3.95 |

The amount of U-235 contained in the region b is about 31% relative to the whole fuel assembly. This value is higher by about 15% than that in the representative case of a 9×9 lattice of FIG. 14. The amount of U-235 contained in the region a is 17% and equal to that of the representative case of FIG. 14.

In this embodiment having the 9×9 fuel rod lattice and the plurality of large water rods, the control rod worth at cold can be made higher by 0.4% $\Delta k/k$ than in the representative case of FIG. 14, with a local power peaking factor the same as that of the representative case of FIG. 14. Moreover, the reactivity difference between the run state and the cold state can be reduced by about 0.1 % $\Delta k/k$.

The large water rods are utilized to increase the relative amount of U-235 in the region b in this embodiment, but the average fuel density in the rods of region b can be higher than that of any other region, or the average outer diameter of the fuel pellets in the rods of region b may be larger than that of any other region. In the foregoing embodiment, the control rod worth at cold is increased by about 0.9% $\Delta k/k$ by increasing the fuel density of the portion of the fuel belonging to the region b by about 8%.

Figure 4B:
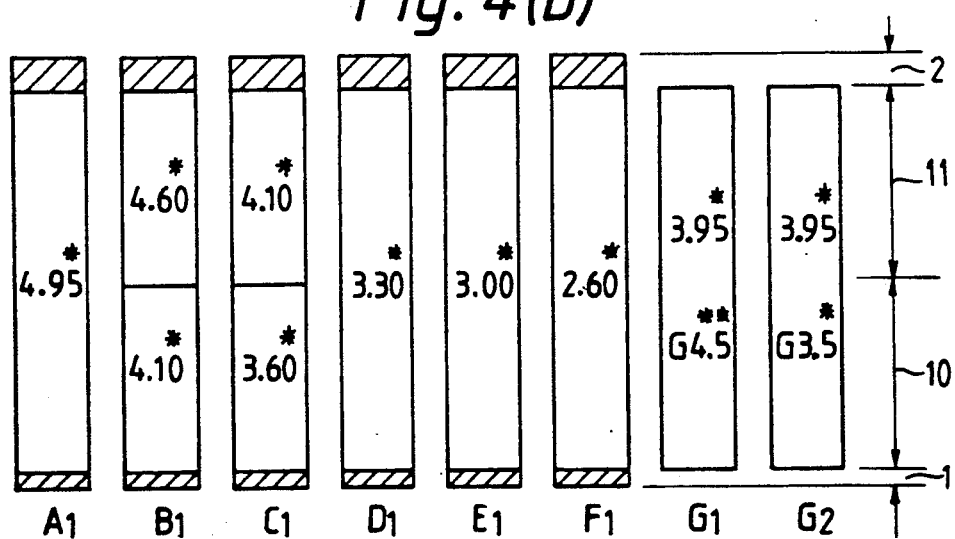

FIGS. 4(a) and 4(b) are a horizontal section showing the fuel assembly of a fourth embodiment of the present invention and a distribution diagram of its fuel enrichment (in weight %), respectively. Some of the fuel rods have an uneven axial distribution of the fuel enrichment. FIG. 4(b) also shows the proportions (in 24ths) of the fuel rod height in which the fuel is distributed.

In FIG. 4(a) and also in FIG. 5(a) below, the regions a,b,c,d defined above are not indicated, but the orientation of the diagram is the same as that of FIGS. 1 to 3.

The enrichments (wt. %) of the individual fuel rods types in the present embodiment are designated by $A_1$, $B_1$, $C_1$—$G_1$ and $G_2$ FIG. 4(b) shows that there is uneven axial distribution of the fuel enrichment (wt. %) of the fuel rod symbols $B_1$ and $C_1$. The fuel enrichments of the individual fuel rods are shown in FIG. 4(b). For the upper and lower portions of the fuel assembly, the relative amount of U-235 contained in the region b is about 31% compared with the total amount. The relative amount of U-235 contained in the region a (i.e. 18% in the upper portion of the fuel assembly, and 17% in the lower portion) is substantially equal to that of the representative case of a 9×9 lattice of FIG. 14.

In the present embodiment, too, the control rod worth at cold and the reactivity difference between the run state and the cold state can be improved as in the embodiment of FIG. 3. Moreover, the axial power distribution can be flattened, and the reactivity difference between the run state and the cold state can be improved, permitting reduction of the amount of gadolinium added and improving the neutron economy.

FIGS. 5(a) and 5(b) are a horizontal section showing the fuel assembly of a fifth embodiment of the present invention and a distribution diagram of its fuel enrichment (in weight %), respectively.

FIG. 5(a) shows a fuel assembly in which the present invention is applied to an upper portion of the reactor core, when the fuel assembly is loaded. In the present embodiment, the portion from 11/24 to 22/24 of the effective fuel length from the lower end of the fuel rods has the structure of the present invention. As shown, the fuel assembly of the present invention is obtained by changing the fuel enrichments (wt. %) of the fuel rods $B_2$ and $C_2$ in the upper portion of the fuel assembly. In the present embodiment, the relative amount of U-235 contained in the region b at the axial upper portion is about 31% compared with the total amount of that portion.

In this portion of the fuel assembly, which corresponds to the upper portion of the core, the reactivity difference between the run state and the cold state can be improved, as has been described. The cold shut-down margin is one of the design restricting conditions of the core. The cold shut-down margin at the end of the cycle is seriously influenced by the reactivity difference between the run state and the cold state of the fuel at the upper core portion. The cold shut-down margin becomes more significant for a larger reactivity difference between the run state and the cold state of the fuel assembly. By applying the present invention to the upper portion of the core, according to the present embodiment, the reactivity difference between the run state and the cold state can be reduced without deteriorating another core running characteristic such as the maximum linear heat generation ratio, thus improving the cold shut-down margin.

In the embodiments of the invention described above, the ratios of the average concentration of fissile material per fuel rod in region b to that in region c in each case are as follows:

| FIG. 1 | 1.10 |
|---|---|
| FIG. 2 | 1.13 |
| FIG. 3 | 1.08 |
| FIG. 4 (upper portion) | 1.08 |
| FIG. 5 (upper portion) | 1.08 |

FIG. 6(a) is a diagram showing a part of a D-lattice core, in which a fuel assembly of the present invention e.g. as shown in FIG. 3 and three fuel assemblies 121 of the prior art are arranged around a cross-shaped control rod 122.

FIG. 6(b) shows one embodiment of a boiling water reactor core 131 when the fuel assembly (of FIG. 6a) of the present invention is loaded in the core. FIG. 6(a) shows that the region a, i.e., the outer fuel rod group, in which the relative amount of the fissile material relative to that of all the regions is minimized, faces the cross control rod 122. The present embodiment is directed to a transfer core in which the three fuel assemblies 121 of the prior art and one fuel assembly of the present invention are loaded around the cross control rod 122. Although the transfer core is presented as the embodiment, the core may be constructed exclusively of the fuel assemblies of the present invention.

Since the fuel assembly of the present invention can improve the control rod worth at cold and the reactivity difference between the run state and the cold state, it is possible to improve the cold shut-down margin of the core which is loaded with the fuel assembly of the present invention. As has been described in the general description, moreover, the fuel assembly of the present invention can flatten the neutron flux distribution in the assembly.

As a result, it is possible to reduce the degree of radiation damage of the channel box enclosing the fuel assembly.

If, moreover, the supply of plutonium grows sufficient in the future to allow the use of MOX fuels, (mixed oxide fuels) the effects of the present invention can be further enhanced by using Pu-239 at least partly in place of the amounts of U-235 of the region b in the embodiment of FIG. 1, for example.

What is claimed is:

1. A nuclear fuel assembly for a nuclear reactor, having a plurality of vertically extending fuel rods arranged side by side in a square array and containing fissile material, said array having two adjacent first sides which, when the fuel assembly is in said reactor core, are next to a control rod region of said core and two adjacent second sides which, when the fuel assembly is in said reactor core, are next to a non-control rod region of the core, wherein, when said array as seen in horizontal cross section is divided into four regions a–d and excluding from any said regions the rods lying on the diagonal line joining opposite corners of the array at which a said first side meets a second side, said four regions being
   a: the rods in the row and column of said array adjoining said first sides;
   b: the rods lying between said region a and said diagonal line;
   c: the rods lying between said region d and said diagonal line,
   d: the rods in the row and column of said array adjoining said second sides and;
over at least part of the height region of said assembly containing fissile material, the average concentration of fissile material per fuel rod is higher in said region b than said region c by at least 5% and, among all said regions a, b, c, d, is a minimum in said region a.

2. A fuel assembly according to claim 1 wherein said average concentration of fissile material per fuel rod is higher in said region b than in said region c by an amount in the range of at least 5–10%.

3. A fuel assembly according to claim 1 wherein a plurality of said fuel rods contain burnable poison, there being more of said rods containing said burnable poison in said region c than in said region b.

4. A fuel assembly according to claim 1 having at least one water rod occupying a central position in said array symmetrical with respect to said diagonal line and with respect to the other diagonal line joining opposite corners of the array at which respectively said first sides meet each other and said second sides meet each other.

5. A fuel assembly according to claim 1 having at least one water rod located wholly within said region c, there being no water rod in said region b.

6. A fuel assembly according to claim 1 wherein the number of said fuel rods in said region b is larger than the number thereof in said region c.

7. A fuel assembly according to claim 1 wherein said fissile material is present in fuel pellets in said fuel rods, the average outer diameter of the fuel pellets being larger in said region b than in said region c.

8. A fuel assembly according to claim 1 wherein said fissile material is present in pellets in said fuel rods, and the average pellet density per fuel rod is higher in said region b than in said region c.

9. A fuel assembly according to claim 1 having at least one water rod located in said array, wherein at least one of (i) the number of water rods and (ii) the total flow passage area of said at least one water rod is larger in said region c than in said region b.

10. A fuel assembly according to claim 1 wherein said fissile material comprises at least one of U-235, Pu-239 and Pu-241.

11. A nuclear fuel assembly for a nuclear reactor, having a plurality of vertically extending fuel rods arranged side by side in a square array and containing fissile material, said array having two adjacent first sides which, when the fuel assembly is in said reactor core, are next to a control rod region of said core and two adjacent second sides which, when the fuel assembly is in said reactor core, are next to a non-control rod region of the core, wherein, when said array as seen in horizontal cross section is divided into four regions a–d and excluding from any said regions the rods lying on the diagonal line joining opposite corners of the array at which a said first side meets a said second side, said four regions being
   a: the rods in the row and column of said array adjoining said first sides;
   b: the rods lying between said region a and said diagonal line;
   c: the rods lying between said region d and said diagonal line,
   d: the rods in the row and column of said array adjoining said second sides and;
over at least part of the height region of said assembly containing fissile material, the average concentration of fissile material per fuel rod is higher in said region b than said region c by at least 5% and, among all said regions a, b, c, d, is a minimum in said region a, and said fuel assembly further including at least one water rod occupying in said array a central position symmetrical with respect to said diagonal line and with respect to the other diagonal line joining opposite corners of the array at which respectively said first sides meet each other and said second sides meet each other.

12. A nuclear fuel assembly for a nuclear reactor, having a plurality of vertically extending fuel rods arranged side by side in a square array and containing fissile material, said array having two adjacent first sides which, when the fuel assembly is in said reactor core, are next to a control rod region of said core and two adjacent second sides which, when the fuel assembly is in said reactor core, are next to a non-control rod region of the core, wherein, when said array as seen in horizontal cross section is divided into four regions a–d and excluding from any said regions the rods lying on the diagonal line joining opposite corners of the array at which a said first side meets a said second side, said four regions being
   a: the rods in the row and column of said array adjoining said first sides;
   b: the rods lying between said region a and said diagonal line;
   d: the rods in the row and column of said array adjoining said second side and;
   c: the rods lying between said region d and said diagonal line,
over at least part of the height region of said assembly containing fissile material, the average concentration of fissile material per fuel rod is higher in said region b than said region c by at least 5% and, among all said regions a, b, c, d, is a minimum in said region a, and said fuel assembly further including at least one water rod arranged in said array wholly within said region c, there being no water rod in said region b.

13. A nuclear reactor core containing at least one fuel assembly according to claim 1.

14. A nuclear reactor core containing at least one nuclear fuel assembly according to claim 1, said core having a first water gap constituting a control rod region adjacent said two first sides of said fuel rod assembly and a second water gap comprising a non-control rod region adjacent said two second sides of said fuel assembly, said first water gap being wider than said second water gap.

15. A nuclear reactor core containing at least one nuclear fuel assembly according to claim 11.

16. A nuclear reactor core containing at least one nuclear fuel assembly according to claim 11 said core having a first water gap constituting a control rod region adjacent said two first sides of said fuel rod assembly and a second water gap comprising a non-control rod region adjacent said two second sides of said fuel assembly, said first water gap being wider than said second water gap.

17. A nuclear reactor core containing at least one nuclear fuel assembly according to claim 12.

18. A nuclear reactor core containing at least one nuclear fuel assembly according to claim 12 said core having a first water gap constituting a control rod region adjacent said two first sides of said fuel rod assembly and a second water gap comprising a non-control rod region adjacent said two second sides of said fuel assembly, said first water gap being wider than said second water gap.

* * * * *